No. 666,739. Patented Jan. 29, 1901.
W. F. DAVIS.
MOTOR VEHICLE.
(Application filed Jan. 2, 1900.)
(No Model.) 7 Sheets—Sheet 1.
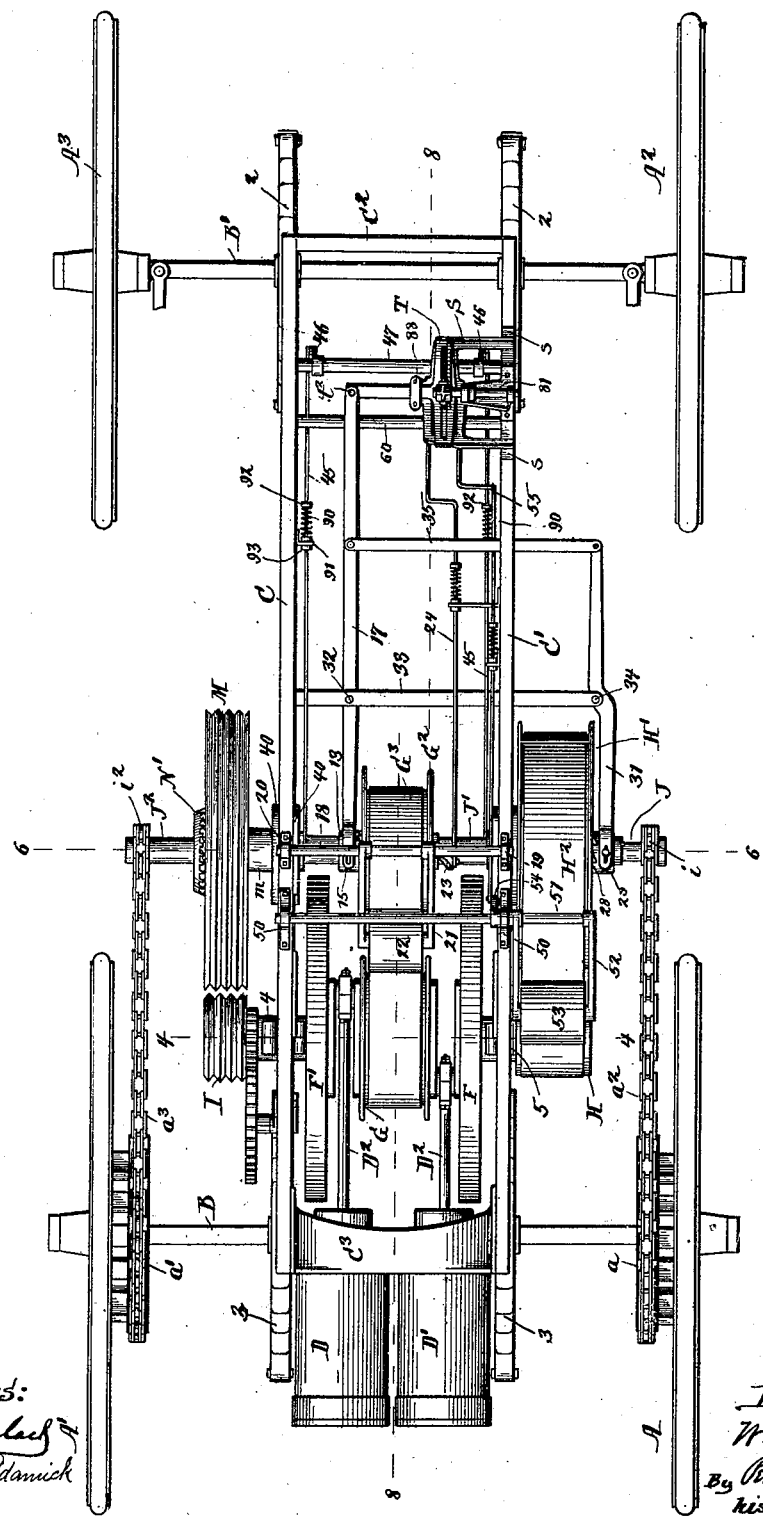
Witnesses:
Inventor:
W. F. Davis
By his Attorneys.

No. 666,739. Patented Jan. 29, 1901.
W. F. DAVIS.
MOTOR VEHICLE.
(Application filed Jan. 2, 1900.)
(No Model.) 7 Sheets—Sheet 2.
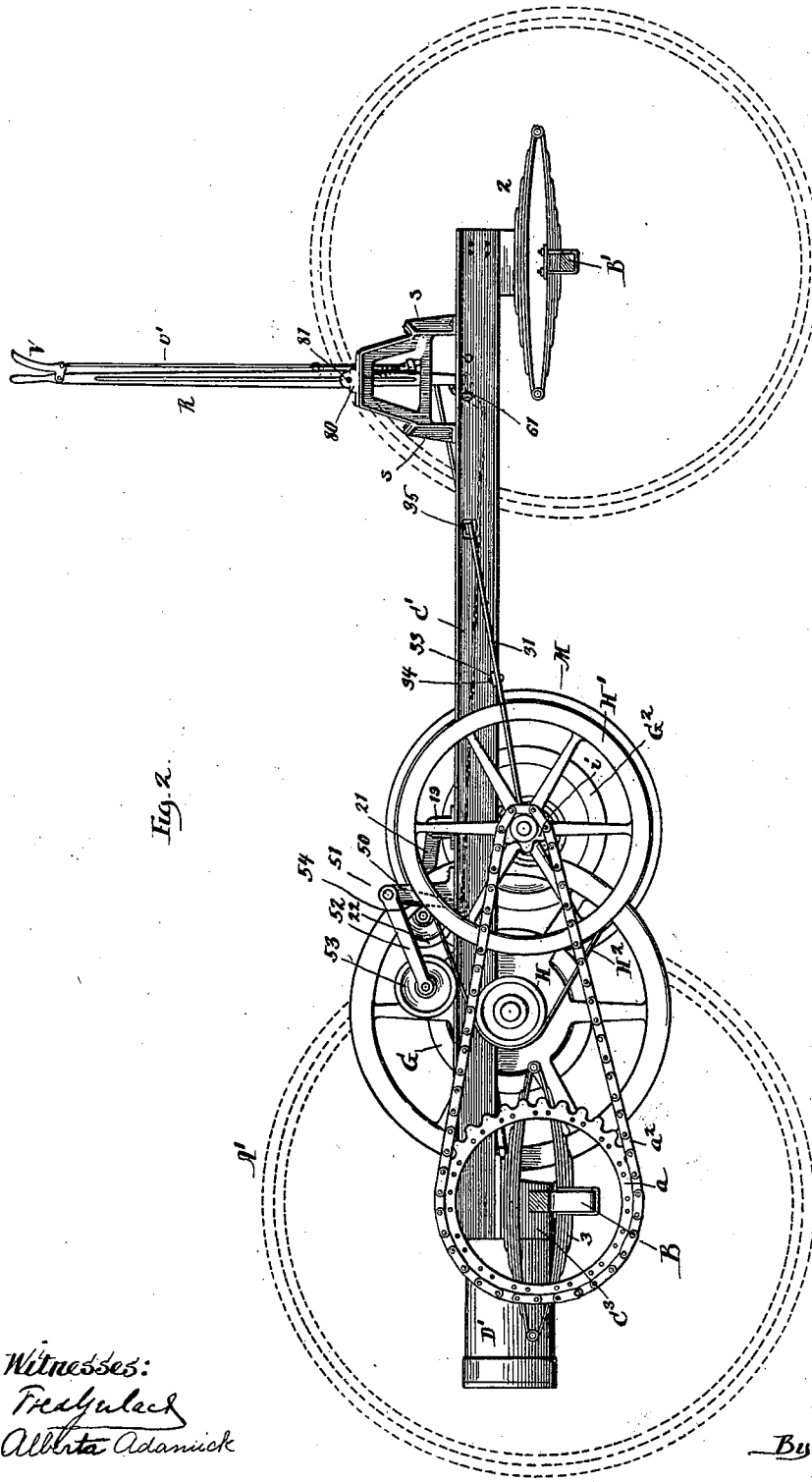

No. 666,739. Patented Jan. 29, 1901.
W. F. DAVIS.
MOTOR VEHICLE.
(Application filed Jan. 2, 1900.)
(No Model.) 7 Sheets—Sheet 3.
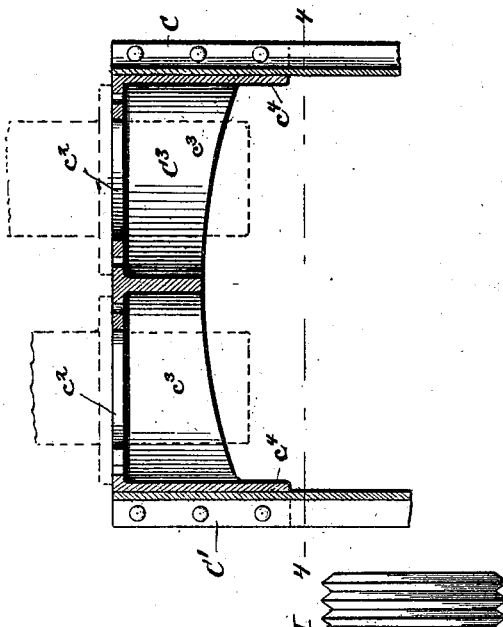
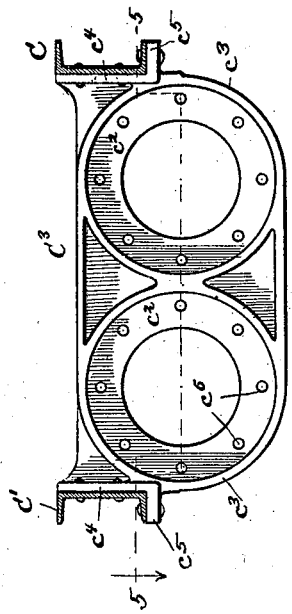
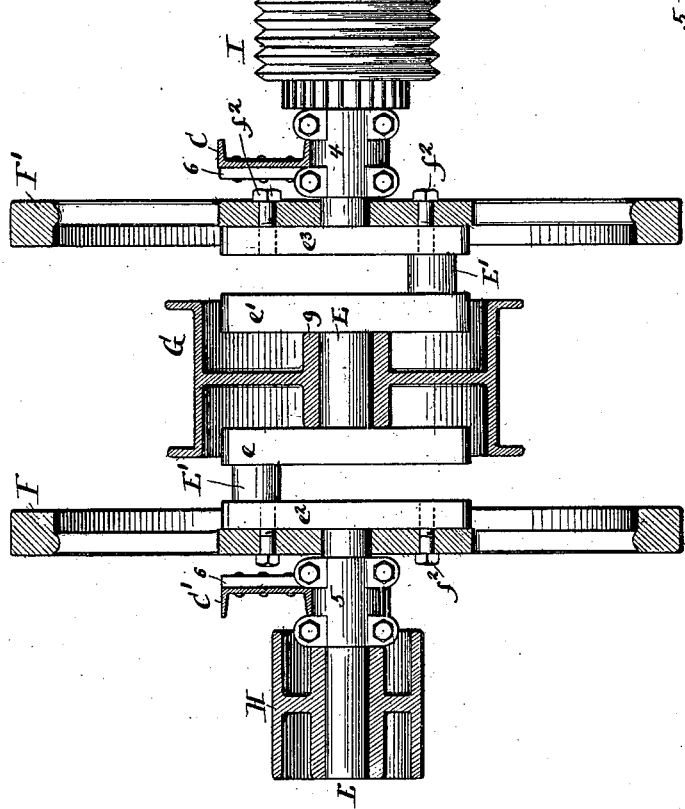
Witnesses:
Fred Gerlach
Albertta Adamick
Inventor:
W. F. Davis
By Prince & Fisher
his Attorneys No. 666,739. Patented Jan. 29, 1901.
W. F. DAVIS.
MOTOR VEHICLE.
(Application filed Jan. 2, 1900.)
(No Model.) 7 Sheets—Sheet 4.
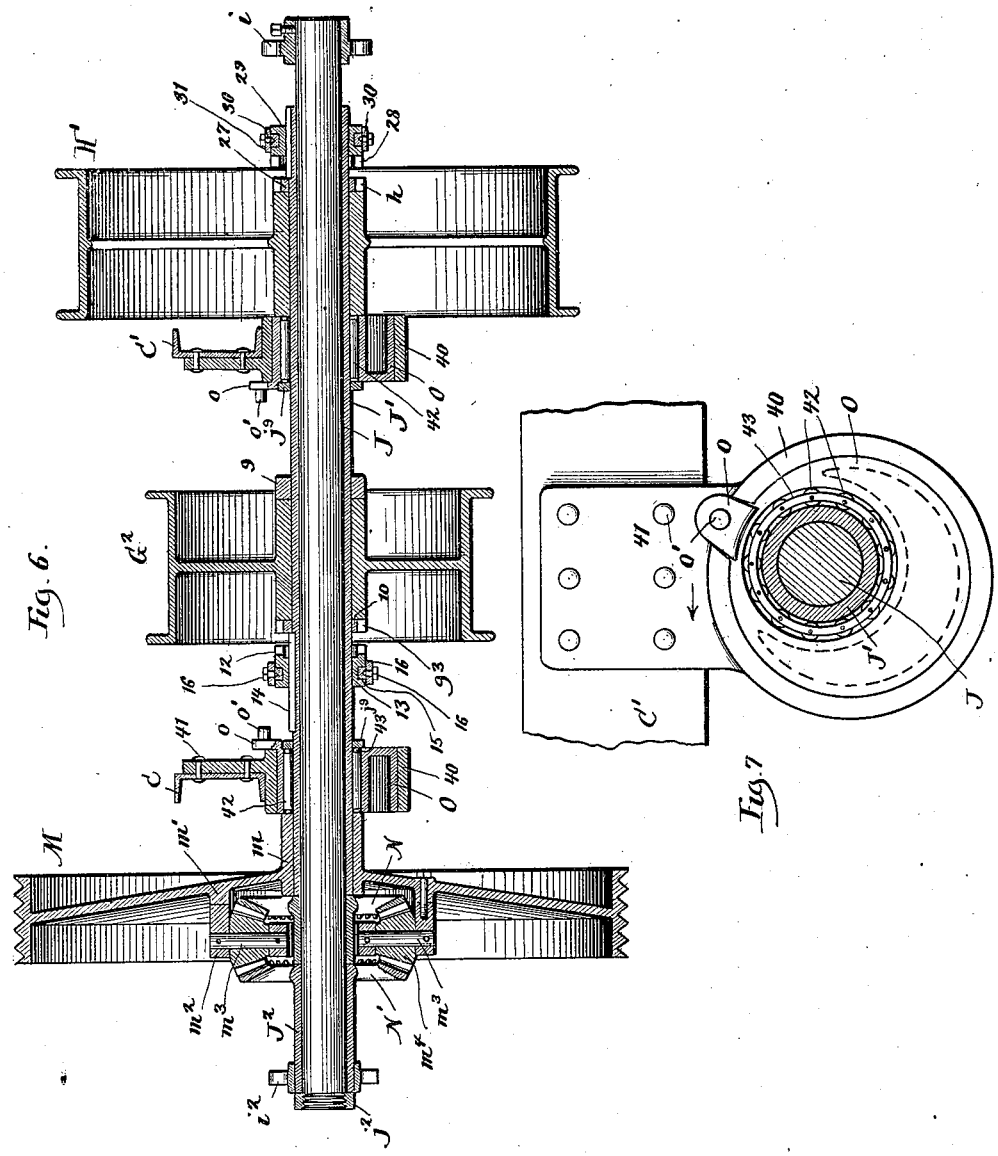

No. 666,739.
W. F. DAVIS.
MOTOR VEHICLE.
(Application filed Jan. 2, 1900.)
Patented Jan. 29, 1901.
(No Model.)
7 Sheets—Sheet 5.
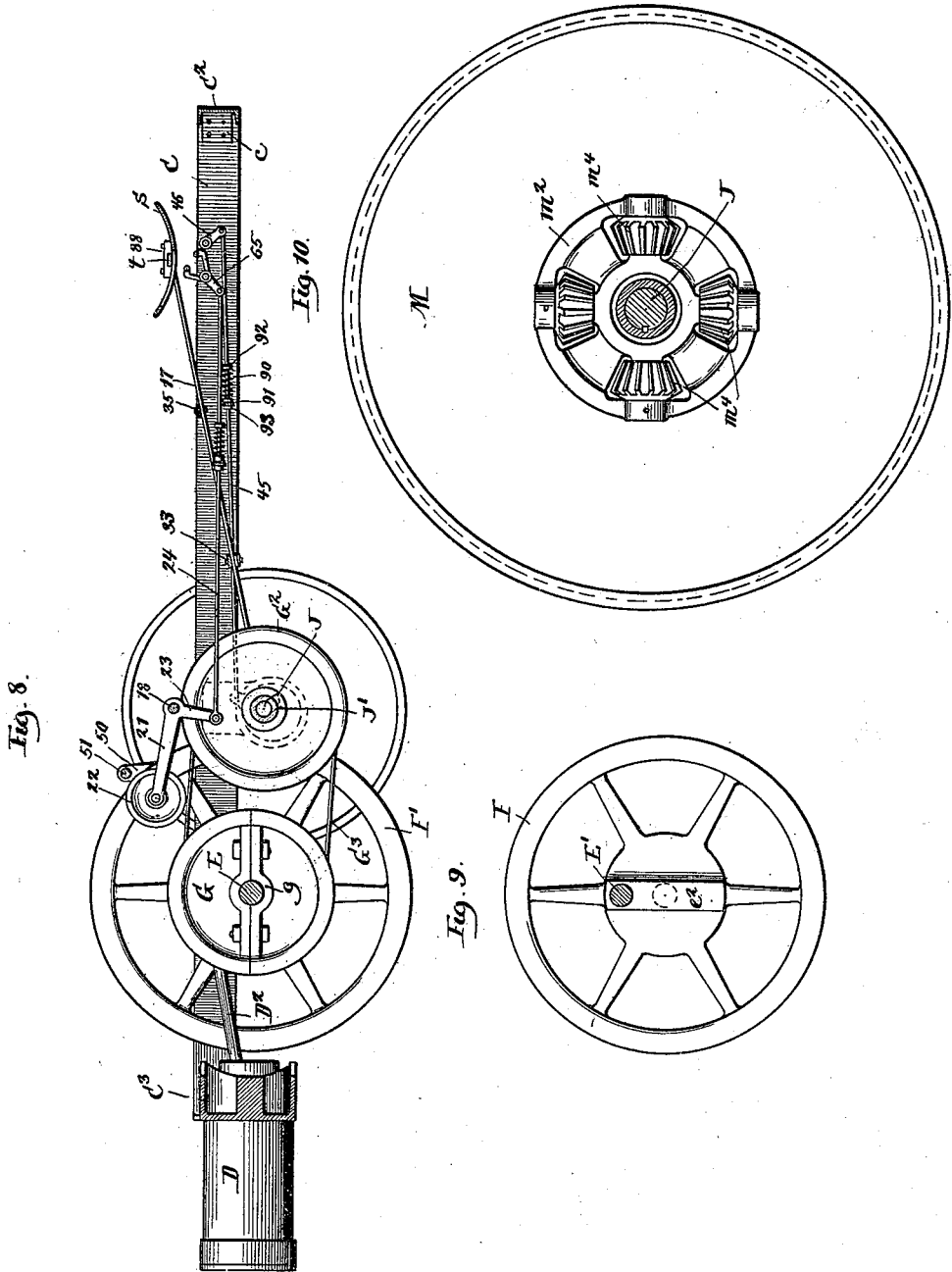

No. 666,739. Patented Jan. 29, 1901.
W. F. DAVIS.
MOTOR VEHICLE.
(Application filed Jan. 2, 1900.)
(No Model.) 7 Sheets—Sheet 6.
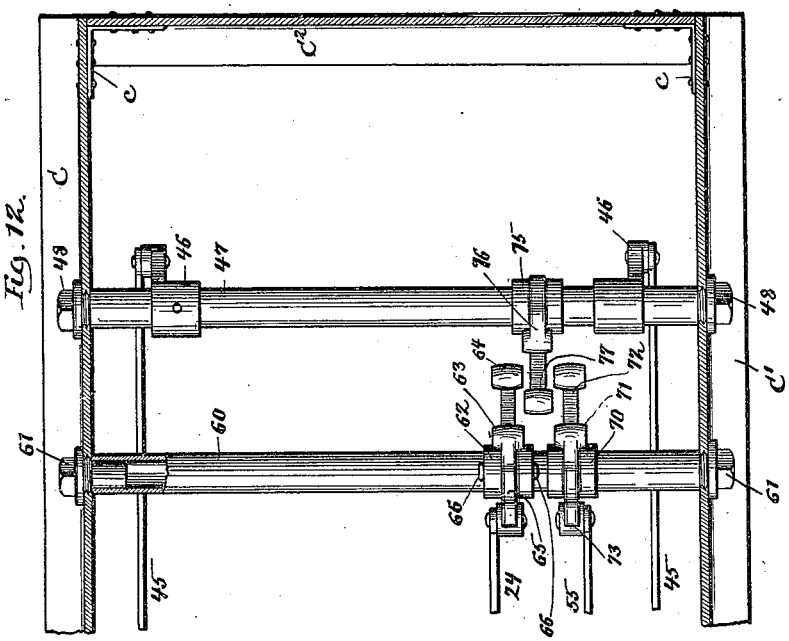
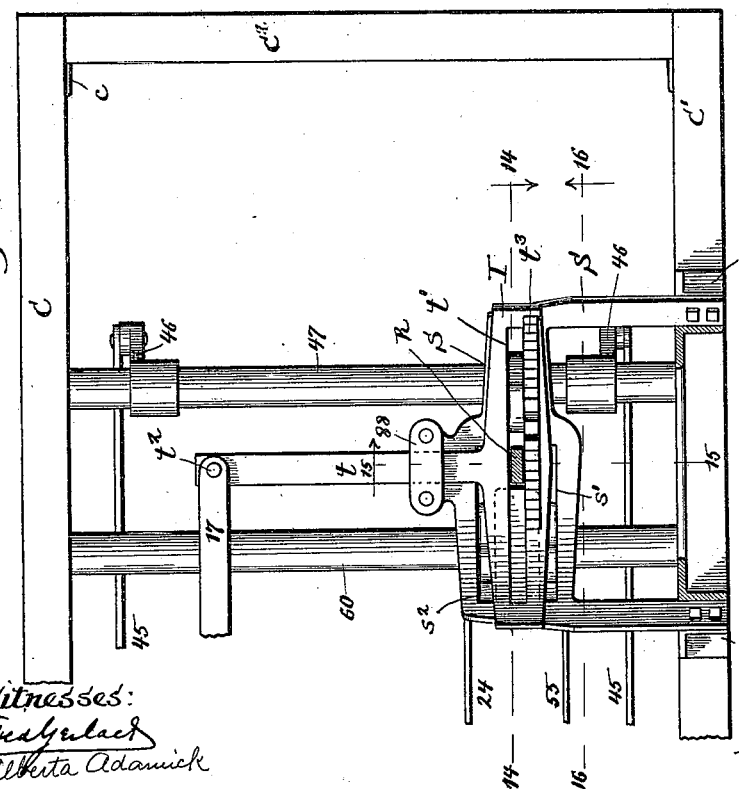
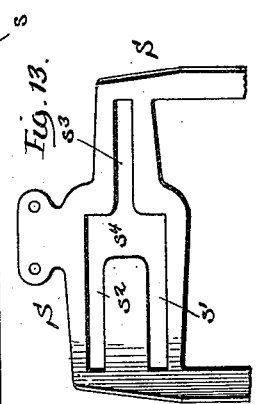
Witnesses:
Fred Gerlach
Alberta Adamick
Inventor:
W. F. Davis
By Finn & Fisher
his Attorneys.

No. 666,739. Patented Jan. 29, 1901.
W. F. DAVIS.
MOTOR VEHICLE.
(Application filed Jan. 2, 1900.)
(No Model.) 7 Sheets—Sheet 7.
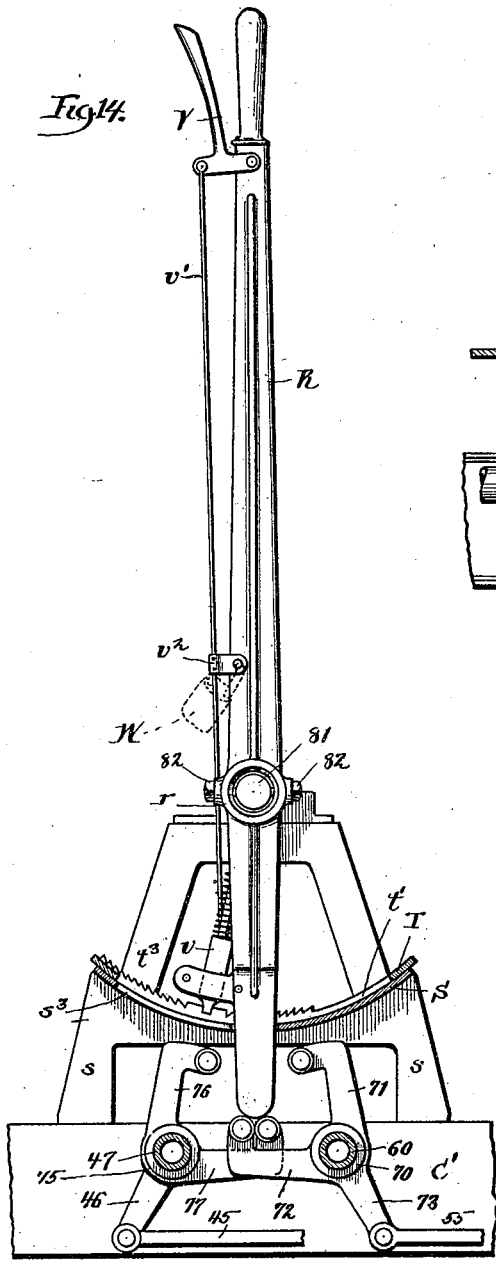
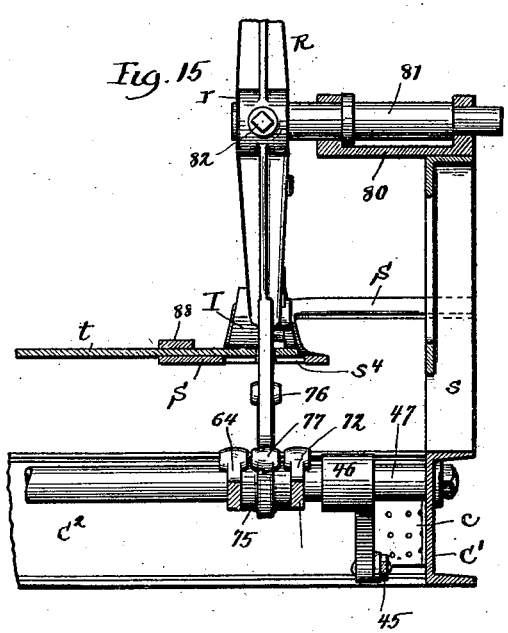
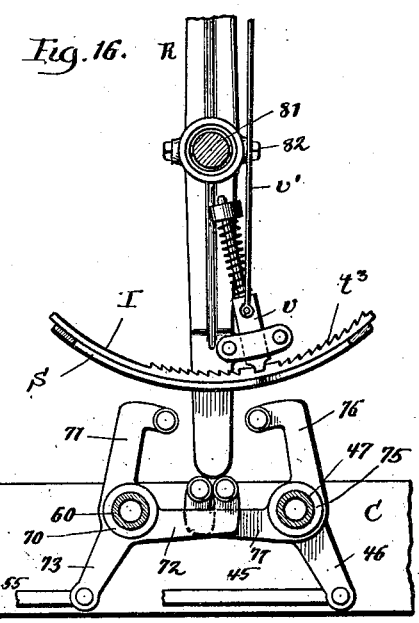
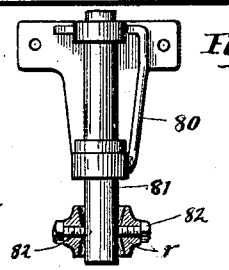
Witnesses:
Fred Gerlach
Alberta Adamick
Inventor:
W. F. Davis
By Pierce & Fisher
his Attorneys.

UNITED STATES PATENT OFFICE.

WILLIAM F. DAVIS, OF MILWAUKEE, WISCONSIN.

MOTOR-VEHICLE.

SPECIFICATION forming part of Letters Patent No. 666,739, dated January 29, 1901.

Application filed January 2, 1900. Serial No. 98. (No model.)

*To all whom it may concern:*

Be it known that I, WILLIAM F. DAVIS, a resident of the city and county of Milwaukee, State of Wisconsin, have invented certain new and useful Improvements in Motor-Vehicles, of which the following is a full, clear, and exact description.

This invention has for its main objects to provide, first, improved driving mechanism for motor-vehicles, and, second, to provide an improved construction of frame for such vehicles.

The invention consists in the various features of improvement hereinafter described, illustrated in the accompanying drawings, and particularly pointed out in the claims at the end of this specification.

Figure 1 is a plan view of a motor-vehicle embodying my invention. Fig. 2 is a view in side elevation, the supporting-wheels at one side being removed and part of the main frame being broken away. Fig. 3 is a view in vertical cross-section on line 3 3 of Fig. 1, the parts being shown upon an enlarged scale. Fig. 4 is a view in vertical cross-section on line 4 4 of Fig. 5. Fig. 5 is a view in horizontal section on line 5 5 of Fig. 4. Fig. 6 is a view in vertical cross-section on line 6 6 of Fig. 1, the parts being shown upon an enlarged scale. Fig. 7 is an enlarged detail side view of the eccentric mechanism on the counter-shaft. Fig. 8 is a view in vertical longitudinal section on line 8 8 of Fig. 1. Fig. 9 is a detail side view of one of the fly-wheels. Fig. 10 is a detail side view of the gear mechanism of one of the friction-wheels. Fig. 11 is an enlarged plan view, partly in section, of the front end of the vehicle. Fig. 12 is a detail view, in horizontal section, through the front part of the vehicle adjacent the operating-lever. Fig. 13 is a detail plan view of the guide-plate at the bottom of the operating-lever. Fig. 14 is a detail view, in vertical section, of the front part of the vehicle, the section being taken on line 14 14 of Fig. 11. Fig. 15 is a view in cross-section on line 15 15 of Fig. 17. Fig. 16 is a view in vertical section on line 16 16 of Fig. 11. Fig. 17 is a detail plan of the shaft and bracket which carries the operating-lever.

A A' designate the rear traction-wheels of a vehicle, and $A^2 A^3$ denote the front wheels. The wheels A A' are mounted upon the axle B, and the wheels $A^2 A^3$ are mounted upon the axle B'.

The main frame of the vehicle is formed of side bars C and C', these side bars consisting of channel-bars that are united together at their front ends by a channel-bar $C^2$ and at their inner ends by a casting $C^3$. (See Figs. 1, 4, 5, 8, and 11.) The channel-bar $C^2$ is connected to the side bars C C' by means of angle-plates $c$, the parts being riveted to the angle-plates in the usual manner. By reference more particularly to Figs. 4 and 5 it will be seen that the casting $C^3$, which extends between the rear ends of the side bars C C', comprises a transverse web $c^2$, having inwardly-extending annular flanges $c^3$, vertical flanges $c^4$, and horizontal flanges $c^5$. The flanges $c^4$ and $c^5$ serve to receive bolts or rivets that unite the casting $C^3$ to the side bars of the frame. The annular flanges $c^3$ serve to receive cylinders D D' of the explosive-engine, whereby the vehicle will be driven. The reduced inner ends of the cylinders D D' extend through the openings in the transverse web $c^2$ of the casting $C^3$, and by means of bolts the cylinders are securely held in place. It will thus be seen that the casting $C^3$ not only serves as an effective means for joining the rear ends of the side bars of the main frame, but also insures an exceedingly rigid means for sustaining the cylinders of the engine upon the frame.

As shown, the front and rear ends of the main frame rest, respectively, upon the elliptic springs 2 and 3, that may be of any suitable or usual construction, the springs 2 resting upon and being united to the front axle B', while the springs 3 are connected to the crank portion of the rear axle B. It will be understood, of course, that the front end of the main frame will be connected to the front axle in such manner as to permit the front axle to be turned in order to steer the vehicle.

The main drive-shaft E of the engine (see Figs. 1 and 3) is sustained by the hanger-boxes 4 and 5, that are connected to the side bars C C' of the main frame by means of the plates 6, formed in piece with the boxes 4 and 5. The drive-shaft E is provided with the cranks $e$, $e'$, $e^2$, and $e^3$, and to the parts E' of this shaft, at the outer ends of the cranks, connect the piston-rods D² of the engine. (See Fig. 1.) By reference more particularly to Figs. 3 and 9 of the drawings it will be observed that the fly-wheels F F', which are mounted upon the drive-shaft A, are bolted, as at $f^2$, to the cranks $e^2$ and $e^3$, and it will be observed that the several cranks $e$, $e'$, $e^2$, and $e^3$ extend at opposite sides of the shaft E, the purpose of this arrangement being to more effectively balance the shaft and parts attached thereto. Upon the drive-shaft E and between the cranks $e$ and $e'$ is keyed the hub $g$ of the high-speed pulley G, this pulley being formed of sections that are bolted together. Upon one end of the drive-shaft E is fixed the low-speed drive-pulley H, and upon the opposite end of the drive-shaft is fixed the reversing gear-wheel I.

By reference more particularly to Figs. 1 and 6 of the drawings it will be seen that in front of the main drive-shaft E is mounted the counter-shaft J. Upon counter-shaft J is mounted the sleeve J', and centrally upon this sleeve is loosely mounted a pulley G², corresponding to the high-speed pulley G on the main drive-shaft and connected to said pulley G by means of a belt G³. The pulley G² is guarded against lateral movement by suitable collars 9 and 10, that are fixed to the sleeve J' adjacent the ends of the hub of the pulley G². One end of the hub of the pulley G² is formed with an annular set of axially-extending teeth $g^3$, that form one member of a clutch, the opposite member of this clutch comprising a similar annular set of teeth 12, that project inwardly from the clutch-ring 13. There is an annular space formed inside the set of teeth 12 in order to permit said teeth to clear the collar 10 at the end of the hub of the pulley G². The clutch-ring 13 is connected to the sleeve J' by a key-rib 14 in such manner that the clutch-ring can be moved longitudinally of the sleeve in order to pass into and out of engagement with the hub of the pulley G², and the clutch-ring 13 is formed with an annular peripheral groove 15 (see Fig. 1) to receive pins 16, extending inwardly from the yoke-shaped end of the shifting lever 17. Hence it will be seen that when the shifting lever 17 is so operated (in manner to be presently described) as to throw the clutch-ring 13 into engagement with the hub of the pulley G² then revolution will be imparted to the sleeve J from the pulley G², it being seen that at such time the pulley G² is receiving motion from the corresponding pulley G upon the drive-shaft of the engine. Above the pulley G² extends a rock-shaft 18, that is supported by brackets 19 and 20, that rise from the side bars C C' of the main frame, and upon this rock-shaft or rod 18 is mounted a tightener-frame 21, that carries a tightener-wheel 22, that serves to tighten the belt G³, that connects the pulleys G and G². With tightener-frame 21 or with the rock-shaft 18 is connected an arm 23, from which leads a rod 24, whereby the tightener 22 will be operated, as will hereinafter appear.

Upon the sleeve J' of the shaft J is revolubly mounted the pulley H', that is connected by a belt H² with the pulley H on the main drive-shaft. (See Figs. 1, 2, and 6.) At one end of the hub of the pulley H' a collar 27 is attached to the sleeve to guard the pulley against displacement. The outer end of the hub of the pulley H' is formed with a set of annular axially-projecting teeth $h$, that extend over the collar 27 and form one member of a clutch, the other member of the clutch comprising the annular teeth 28, that project inwardly from the side of the clutch-ring 29 at a sufficient distance from the sleeve J' to clear the collar 27. The clutch-ring 29 is keyed to the sleeve J' in manner similar to the clutch-ring 13, hereinbefore described, and this ring 29 is formed with an annular groove to receive the pins 30, that project inward from the yoke-shaped end of the clutch-lever 31. It will thus be seen that when the clutch-lever 31 is shifted so as to cause the teeth of the clutch member 29 to engage with the teeth $h$ and the hub of the pulley H' revolution will be imparted by the pulley H' to the clutch ring or member 29 and through said ring or member 29 to the sleeve J'. The shifting lever 17 of the clutch ring or member 13 is pivotally sustained, as at 32, to a bar 33, that is fastened to the side bars C and C' of the main frame, and the shifting lever 31 of the clutch ring or member 29 is pivoted at 34 to the outer end of the bar 33. One end of the lever 31 is connected by a rod 35 (see Fig. 1) to the shifting lever 17, and by reference to Fig. 1 it will be seen that when the shifting lever 17 is moved in one direction it will serve to connect the members of the clutch at the pulley G² and at the same time hold apart the members of the clutch at the pulley H', and when the shifting lever 17 is moved in opposite direction the reverse will occur.

From the top of the side bars C C' rise brackets 50, (see Figs. 1 and 2,) in which is journaled a rock-shaft 51, that carries the shifter-frame 52, wherein is journaled the tightener-roll 53, that bears upon and serves to tighten the belt H², extending between the pulleys H and H'. To the rock-shaft 51 is connected an arm 54, (see Fig. 1 and dotted lines, Fig. 2,) whereby the rock-shaft is operated, the lower end of the arm 54 being attached to a shifting rod 55, that leads to the forward end of the main frame and there connects with suitable operating mechanism, to be presently described.

Upon the sleeve J' of the counter-shaft J is fixed a hub $m$ of the reversing gear-wheel M. As shown, this wheel M is a friction-wheel, its face being formed with peripheral grooves and ribs that engage corresponding grooves and ribs formed on the periphery of the friction-wheel I, that is mounted on the main drive-shaft E. The outer face of the web of the friction-wheel M is shown as formed with an annular rib $m'$, to which is bolted a pinion-frame $m^2$, (see Figs. 6 and 10,) having journals $m^3$, whereon are revolubly mounted the beveled pinions $m^4$. These pinions $m^4$ engage with the beveled gear-wheels N and N', that are arranged upon opposite sides of the pinions $m^4$. (See Figs. 6 and 10.) The gear-wheel N has its hub keyed to the counter-shaft J, while the beveled gear-wheel N' is formed in piece with or fixed to a sleeve $J^2$, that is mounted upon the shaft J. A threaded collar $j^2$ upon the end of the shaft J serves to guard the sleeve against displacement. The purpose in employing the gear-wheels N and N' and intermediate pinions $m^4$, forming a differential gear, is to allow for the differential movement of the rear traction-wheels of the vehicle when traversing a curve.

In order to enable the friction-wheel M to be brought into engagement with the friction-wheel I on the main drive-shaft, the counter-shaft J and sleeve J' are mounted in such manner that they can be moved back and forth. By reference more particularly to Figs. 6 and 7 of the drawings it will be seen that the counter-shaft J is journaled in the eccentrics O, that encircle the sleeve J'. As each of the eccentrics O and the parts that sustain it are the same, a description of one will answer for both. Each eccentric O is revolubly mounted within a hanger-yoke 40, an arm of which is bolted, as at 41, to the corresponding side bar of the main frame. Preferably a series of bearing-rollers 42 are interposed between the shaft J' and each of the eccentrics O, these bearing-rollers having their axles connected to rings 43 at their ends, and collars $j^3$, fixed to sleeve J', serve to retain the parts against displacement. From each eccentric O projects an arm or lug $o$, to the wrist-pin $o'$ of which is connected one end of a backing-rod 45. The forward ends of the rods 45 are connected to the arms 46 of a rock-shaft 47, that is journaled at the front of the main frame upon trunnions 48, that are screw-threaded to enter corresponding threaded holes in the vertical webs of the side bars C C'. (See Fig. 14.) The rock-shaft 47 is preferably a pipe or tube, into the ends of which project the smooth inner ends of the screws 48. From the foregoing description it will be seen that if the rock-shaft 47 is shifted so as to cause the rods 45 to move in the direction of the arrow, Fig. 7, the eccentrics O, the shaft J, and parts carried thereby will be shifted rearwardly, thereby causing the friction-wheel M to engage the corresponding friction-wheel I upon the main drive-shaft. This backward movement of the shaft J, and consequent meshing with the friction-wheels M and I, will cause the shaft J and the sleeve M to be reversely driven, so as to effect the backing of the vehicle. By reference more particularly to Figs. 1, 2, and 6 it will be seen that the traction-wheel A has bolted thereto a sprocket-wheel $a$, while the traction-wheel A' has bolted thereto a similar sprocket-wheel $a'$. The sprocket-wheel $a$ is connected by a chain $a^2$ to a sprocket-wheel $i$, that is keyed to one end of a shaft J, and the sprocket-wheel $a'$ is connected by a sprocket-chain $a^3$ to a sprocket-wheel $i^2$, that is keyed to the sleeve $J^2$ on the opposite end of the shaft J.

By reference more particularly to Figs. 1, 2, and 11 to 16 of the drawings it will be seen that between the side bars C C' of the main frame, adjacent its forward end, extends a rock-shaft 60, that is pivotally mounted upon screws 61, that enter threaded holes in the side bars of the main frame, the smooth inner portions of the screws 61 entering the ends of the tubular rock-shaft 60. Upon the rock-shaft 60 is loosely mounted the hub 62, from which project the rock-arms 63, 64, and 65, the rock-arm 65 being connected to the forward end of the shifting rod 24, by which the belt-tightener of the high-speed pulleys is controlled. The rock-arms 63 and 64 extend forwardly and preferably laterally, as shown in Figs. 12 and 14, and the purpose of this arrangement will presently more fully appear. In order to prevent the lateral movement of the hub 62, suitable stops or pins 66 are fixed to the shaft 60 at each side of the hub. (See Fig. 12.)

Keyed to the rock-shaft 60 is the hub 70, from which project the rock-arms 71, 72, and 73. The rocking arm 73 is connected with the front end of the shifting rod 55, whereby the belt-tightener 53 of the low-speed pulleys H H' is controlled. The rock-arms 71 and 72 extend forwardly from the rock-shaft 60 and preferably in outward direction, the position of these rock-arms corresponding to the position of the rock-arms 63 and 64, hereinbefore described. Upon the rock-shaft 47 is keyed the hub 75, and to this shaft is connected one of the rock-arms 46 (hereinbefore described) and the rock-arms 76 and 77, that extend inwardly and with laterally-projecting ends from the rock-shaft 47. The purpose of the rock-arms 63 and 64 is to control the movement of the belt-tightener of the high-speed pulleys, the purpose of the rock-arms 71 and 72 is to control the belt-tightener of the low-speed pulleys, and the purpose of the rock-arms 76 and 77 is, through the medium of the shifting rods 45, to control the movement of the eccentrics O, (see Figs. 6 and 7,) whereby the counter-shaft J is shifted back and forth in order to bring the friction-wheels M and I into engagement when it is desired to back the vehicle. The movement of these several rock-arms will be effected by means of lever mechanism next to be described.

Upon a suitable bearing 80 at the top of frame D is pivotally sustained a short shaft 81, that passes through a perforated hub or boss $r$ of the operating-lever R. (See Fig. 15.) Through the hub or boss $r$ pass the set-screws 82, the pointed ends of which enter conical seats formed in the short shaft 81 and serve as trunnions to permit the lateral vibration of the operating-lever R. The lower end of the lever R passes through a segmental plate S, that is suitably sustained by frame s, rising from the side bar C' of the main frame. (See Fig. 14.) This segmental plate S is shown in detail in Fig. 13, and by reference to Fig. 12 it will be seen that the plate S is formed with the longitudinal slots $s'$, $s^2$, and $s^3$ and with the transverse slot $s^4$. To the plate S is attached a strap 88, beneath which is held, in manner free to slide, the arm $t$ of the segmental shifting plate T. The operating-lever R passes through a slot $t'$ in the shifting plate T, and the arm $t$ of this plate is pivotally connected, as at $t^2$, to the forward end of the shifting rod 17, whereby the clutch mechanism hereinbefore described is controlled. The upper face of the shifting plate T is provided with ratchet-teeth $t^3$, with which will engage a slidable latch $v$, (see Fig. 12,) that is connected to the lower part of the operating-lever R, the movement of this latch $v$ being controlled by a rod $v'$, the upper end of which is connected to a pivoted grip-handle V, that is pivotally attached adjacent the upper end of the operating-lever R. To the rod $v'$ is connected a loop or strap $v^2$, having a hole therein, and through this hole and through a corresponding hole in the operating-lever may be passed a hasp or suitable lock by which the lever R can be locked against movement when the operator desires to leave the vehicle.

The lower end of the operating-lever R stands normally about midway of the slot $s^4$ of the plate S and between the ends of the rocking arms 76 and 77. The normal position of these rocking arms 76 and 77 is that shown in Figs. 12 to 15 of the drawings, and in such position the arms are held by reason of the coil-springs 90, that encircle the rods 45, that are attached to the lower end of the rock-arms 46, depending beneath the rock-shaft 47. The springs 90 bear against studs 91, extending inwardly from the side bars C C' of the main frame, and against collars 92, fixed to the rods 45. Collars 93 are also attached to the rods 45, so as to limit the movement of the rods in forward direction. When the upper end of the operating-lever R is swung to the right, its lower end will be swung to the left and opposite the slot $s^2$ of the plate S. The lower end of the operating-lever will then be brought between the ends of the rock-arms 63 and 64 and in position to operate, through the medium of the shifting rod 24, the belt-tightener of the high-speed pulleys G and G'. So, also, when the upper end of the operating-lever R is swung to the left the lower end of this lever will be brought opposite the slot $s'$ of the plate S and between the ends of the rock-arms 71 and 72 and in position to operate, through the medium of the shifting rod 55, the belt-tightener 53 of the low-speed pulleys H and H'. By reference more particularly to Figs. 1, 6, 11, and 12 of the drawings it will be seen that when the upper end of the operating-lever is shifted to the left the lower end of the operating-lever will carry with it the shifting plate T, and the lateral movement of this plate, through the medium of the arm $t$ and the rods 17, 35, and 31, will cause the clutch-ring 29 to engage with the clutch-teeth $h$ of the pulley H' and at the same time will hold the clutch-ring 13 out of engagement with the clutch-teeth on the hub of the pulley $G^2$, thereby throwing the low-speed pulley H' into engagement with the sleeve J' and, through the intermediate mechanism, into connection with the counter-shaft J. If now the operator pushes forwardly the upper end of the operating-lever R, the lower end of this lever will engage with the end of the rock-arm 71, thereby rocking the shaft 60 and causing the rock-arm 73 to draw forwardly the shifting rod 55, so as to force the belt-tightener 53 to bear upon the belt $H^2$ and thus cause the pulley H' to receive revolution from the pulley H. Now inasmuch as the pulley H' has been connected by its clutch mechanism (before described) with the sleeve J' it will be seen that the revolution imparted to the pulley H' will be transmitted, through the sleeve J' and parts connected therewith, to the counter-shaft J and from this counter-shaft, by the sprocket-wheels $i$ and $i^2$, the chains $a^2$ and $a^3$, and sprocket-wheels $a$ and $a'$, to the traction-wheels A and A' of the vehicle. If the operator desires to stop the vehicle, he will pull rearward the upper end of the operating-lever R while its lower end is in the slot $s'$ of the plate S, thereby causing the lower end of the lever R to engage with the end of the rock-arm 72, and thus throw the belt-tightener 53 out of action, so that revolution will be no longer communicated from the pulley H on the drive-shaft to the pulley H'. If the operator desires to proceed at a slower rate of speed, he will swing the upper end of the operating-lever toward the right, so as to bring the lower end of this lever opposite the slot $s^2$ of the plate S and between the ends of the rock-arms 63 and 64. By this lateral shift of the operating-lever the shifting plate T will be moved toward the left, thereby causing the levers 17 and 31 and parts connected therewith to throw the clutch-ring 29 out of engagement with the teeth $h$ on the hub of the pulley H', at the same time throw the clutch-ring 13 into engagement with the teeth on the hub of the high-speed pulley $G^2$. If now the operator pushes forward the upper end of the operating-lever R, the lower end of this lever will engage the rock-arm 63, thereby causing this rock-arm 63 to force forwardly the rock-arm 65, and, through the medium of the shifting rod 24, to throw the belt-tightener 22 into bearing against the belt $G^3$, that connects the pulleys G and $G^2$. The vehicle will then proceed at the higher rate of speed until the pressure of the belt-tightener is relieved by the reverse movement of the operating-lever R. If the operator desires to back the vehicle, the lever R will be shifted to a position opposite the slot $s^3$ of the plate S, at which time the lower end of the lever will extend between the ends of the rock-arms 76 and 77. This movement of the operating-lever R to the central position shown will cause the shifting plate T, through the medium of the levers 17 and 31 and parts connected therewith, to throw both of the clutch-rings 13 and 29 out of engagement, as shown in Fig. 6 of the drawings, thereby altogether disconnecting the counter-shaft J, and consequently the traction-wheels, from engagement with the drive-shaft of the engine. If now the operator should move rearwardly the upper end of the operating-lever, the lower end of this lever will engage the end of rock-arm 76, thereby rocking the shaft 47 and causing the rock-arms 46 to move rearwardly the shifting rods 45, and thus shift the eccentrics O so as to move rearwardly the shaft J and parts carried thereby until the friction-wheel M is brought into engagement with the friction-wheel I at the end of the main drive-shaft. When the operator moves forward the upper end of the lever R, its lower end will engage with the end of the rock-arm 77, causing a reverse movement of the rock-shaft 47 and parts connected therewith, so that the eccentrics O again draw forwardly the counter-shaft J and withdraw the friction-wheel M from engagement with the friction-wheel I on the main drive-shaft. It will be understood, of course, that as the operator shifts the lever R he will operate the grip-handle V, so as to lock the lever in any required position.

It is manifest that instead of employing belt-tighteners and belts between the main drive-shaft and the counter-shaft other equivalent forms of gearing might be adopted for this purpose. This and like changes in the details above set forth may be made within the skill of the mechanic without departure from the spirit of the invention.

Having thus described my invention, what I claim as new, and desire to secure by Letters Patent, is—

1. In a motor-vehicle, the combination with a vehicle-frame, of an engine-cylinder and an engine crank-shaft, supports for said cylinder and said shaft being independently secured to said frame whereby said vehicle-frame also serves as the engine-frame.

2. In motor-vehicles, the combination with a vehicle-frame, comprising side and transverse bars secured together, of an engine-cylinder and an engine crank-shaft, independent supports for said cylinder and said shaft, said cylinder-support forming one of said transverse bars and said shaft-supports secured to said side bars, whereby said vehicle-frame also serves as the engine-frame.

3. A frame for a motor-vehicle comprising side bars and a transverse frame or casting extending between and bolted to said side bars, said transverse frame being provided with a perforated end plate to receive the engine-cylinder and having flanges or ribs upon one side of said end plate.

4. In a motor-vehicle the combination with a drive-shaft having a crank-arm, of a fly-wheel bolted to said crank-arm.

5. In a motor-vehicle the combination with a drive-shaft having a crank-arm extending on opposite sides of said shaft, of a fly-wheel bolted to said crank-arm at opposite sides of the shaft.

6. In a motor-vehicle, the combination with a drive-shaft provided with a drive-pulley and a friction-wheel, of a bodily-movable counter-shaft provided with a corresponding pulley and friction-wheel, a belt between said pulleys and means for shifting said counter-shaft to bring said friction-wheels into engagement and to relieve the tension of said belt.

7. In a motor-vehicle, the combination of a drive-shaft having mounted thereon plural drive-pulleys and a friction-wheel, and a bodily-movable counter-shaft having mounted thereon plural pulleys and a friction-wheel, belts connecting the pulleys of the drive-shaft and the counter-shaft, belt-tighteners for said belts and means whereby said counter-shaft can be shifted to bring the friction-wheels into engagement and to relieve the tension of said belt.

8. In a motor-vehicle, the combination of a drive-shaft provided with a pulley, of a second shaft having a corresponding pulley loosely mounted thereon, a belt between said pulleys, a belt-tightener for said belt, a clutch mechanism on said second shaft for throwing the pulleys thereof into and out of engagement with said shaft, and lever mechanism for operating said belt-tightener and said clutch mechanism.

9. In a motor-vehicle, the combination of a drive-shaft having plural pulleys thereon, of a counter-shaft having corresponding plural pulleys, belts between said pulleys, individual belt-tighteners for said belts, clutch mechanism for throwing the individual pulleys of the counter-shaft into and out of gear with said shaft, a common hand-lever for operating said individual belt-tighteners and said clutch mechanism, and suitable connections leading from said individual belt-tighteners and said clutch mechanism to said common hand-lever.

10. In a motor-vehicle, the combination with a drive-shaft having a pulley and a friction-wheel thereon, a bodily-movable counter-shaft, a corresponding pulley and friction-wheel thereon, a belt connecting said pulleys, a belt-tightener for said belt, a clutch for throwing the pulley of the counter-shaft into engagement with said shaft, and lever mechanism for operating said belt-tightener and said clutch and for bodily shifting said movable shaft.

11. In a motor-vehicle, the combination of a drive-shaft having a pulley and a friction-wheel thereon, a bodily-movable counter-shaft having a corresponding pulley and friction-wheel thereon, a belt connecting said pulleys, a belt-tightener for said belt, a clutch for throwing the pulley of the counter-shaft into engagement with said shaft, a common hand-lever for operating said belt-tightener and said clutch and for bodily shifting said movable shaft and suitable connections between said belt-tightener, said clutch and said bodily-movable shaft and said hand-lever.

12. In a motor-vehicle, the combination of a drive-shaft having plural pulleys and a friction-wheel thereon, a bodily-movable counter-shaft having corresponding plural pulleys and a friction-wheel, belts connecting the pulleys of the drive-shaft and the counter-shaft, individual belt-tighteners for said belts, clutch mechanism for throwing said pulleys into and out of action, means for bodily shifting said counter-shaft to bring the friction-wheels into and out of engagement, a common hand-lever for operating said belt-tighteners, said clutch mechanism and said means for shifting the counter-shaft and suitable connections between said common lever and said last-mentioned parts.

13. In a motor-vehicle, the combination of a drive-shaft, having a pulley and friction-wheel thereon, a counter-shaft having a corresponding pulley and friction-wheel, a third shaft provided with a beveled gear-wheel and with a corresponding beveled gear-wheel loosely mounted thereon, a series of beveled pinions intermediate and engaging said beveled gears operatively connected to said counter-shaft, and means for bodily moving said counter-shaft to bring said friction-wheels into engagement and to relieve the tension of said belt.

14. In a motor-vehicle, the combination of a drive-shaft having a pulley and a friction-wheel thereon, a counter-shaft provided with a corresponding pulley and friction-wheel, a sleeve encircling said counter-shaft and whereon its pulley and friction-wheel are mounted, a second sleeve upon said counter-shaft provided with a beveled gear-wheel, a corresponding beveled gear-wheel keyed to the counter-shaft intermediate said sleeves and beveled pinions carried by said friction-wheel and arranged between said beveled gear-wheels.

15. In a motor-vehicle, the combination of a drive-shaft having plural pulleys or wheels thereon, a counter-shaft having corresponding pulleys and wheels loosely mounted thereon, suitable individual clutches on said counter-shaft for engaging said pulleys or wheels, individual mechanisms for causing the pulleys of the wheels in the counter-shaft to be driven by the corresponding pulleys and wheels on the drive-shaft, and lever mechanism whereby said individual clutches and said individual mechanisms are controlled.

16. In a motor-vehicle, the combination of a drive-shaft having plural pulleys or wheels thereon, a counter-shaft having corresponding pulleys or wheels loosely mounted thereon, suitable individual clutches on said counter-shaft for engaging said pulleys or wheels, individual mechanisms for causing the pulleys or wheels of the counter-shaft to be driven by the corresponding pulleys or wheels of the drive-shaft, a common hand-lever whereby said individual clutches and said individual mechanisms are controlled and suitable connections between said individual clutches and said individual mechanisms and said hand-lever.

17. In a motor-vehicle, the combination of a drive-shaft having plural pulleys or wheels thereon, one being a friction wheel or pulley, a bodily-movable counter-shaft having corresponding pulleys or wheels thereon, one of which is a friction wheel or pulley, mechanism for bodily shifting said counter-shaft to bring its friction-wheel into engagement with the corresponding friction-wheel of the drive-shaft, mechanism for causing one of the pulleys of the drive-shaft to impart revolution to the corresponding pulley of the counter-shaft, a common hand-lever that serves to control the mechanism that bodily shifts the counter-shaft and the mechanism that causes the pulley of the drive-shaft to impart revolution to the corresponding pulley of the counter-shaft and suitable connections between said common lever and said above-mentioned parts.

18. In a motor-vehicle, the combination of a drive-shaft having plural wheels or pulleys thereon, a counter-shaft having corresponding pulleys or wheels loosely mounted thereon, suitable individual mechanisms for causing the pulleys or wheels of the counter-shaft to be driven by the corresponding pulleys or wheels of the drive-shaft, clutches mounted upon said counter-shaft and adapted to engage the pulleys or wheels thereon, said clutches having members mounted to slide lengthwise of said counter-shaft and lever mechanism connected with said clutches and said individual mechanisms whereby either of the pulleys of the counter-shaft may be thrown into or out of action.

WILLIAM F. DAVIS.

Witnesses:
GEO. P. FISHER, Jr.,
ALBERTA ADAMICK.